(12) United States Patent
Nokes et al.

(10) Patent No.: US 11,842,386 B2
(45) Date of Patent: *Dec. 12, 2023

(54) METHOD AND SYSTEM FOR WATCHING ITEMS FOR SALE IN AN AUCTION SYSTEM

(71) Applicant: eBay Inc., San Jose, CA (US)

(72) Inventors: Jeffry A. Nokes, Morgan Hill, CA (US); Michael Joseph Evans, San Francisco, CA (US)

(73) Assignee: EBAY INC., San Jose, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/402,111

(22) Filed: Aug. 13, 2021

(65) Prior Publication Data

US 2022/0036446 A1 Feb. 3, 2022

Related U.S. Application Data

(63) Continuation of application No. 15/953,757, filed on Apr. 16, 2018, now Pat. No. 11,107,154, which is a continuation of application No. 11/954,004, filed on Dec. 11, 2007, now abandoned.

(51) Int. Cl.
G06Q 30/00 (2023.01)
G06Q 30/08 (2012.01)
G06Q 30/0601 (2023.01)

(52) U.S. Cl.
CPC .......... *G06Q 30/08* (2013.01); *G06Q 30/0601* (2013.01)

(58) Field of Classification Search
CPC ..................................................... G06Q 30/00
See application file for complete search history.

(56) References Cited

U.S. PATENT DOCUMENTS

| | | | |
|---|---|---|---|
| 7,577,582 B1 * | 8/2009 | Ojha | G06Q 30/06 705/26.41 |
| 7,624,065 B2 | 11/2009 | Schoen et al. | |
| 8,442,883 B2 | 5/2013 | Rashid | |
| 11,107,154 B2 | 8/2021 | Nokes et al. | |
| 2002/0116316 A1 | 8/2002 | Griffiths | |
| 2002/0156711 A1 | 10/2002 | Dekoven | |
| 2003/0061202 A1 | 3/2003 | Coleman | |
| 2003/0078991 A1 | 4/2003 | Harris | |
| 2003/0093326 A1 | 5/2003 | Poon et al. | |
| 2005/0114229 A1 | 5/2005 | Ackley et al. | |
| 2006/0015451 A1 | 1/2006 | Heyer | |
| 2006/0122929 A1 * | 6/2006 | Schoen | G06Q 30/08 705/37 |
| 2006/0149655 A1 | 7/2006 | Leahy et al. | |

(Continued)

OTHER PUBLICATIONS

U.S. Appl. No. 11/954,004, filed Dec. 11, 2007, Method and System for Watching Items for Sale in an Auction System.

(Continued)

*Primary Examiner* — Mark A Fadok
(74) *Attorney, Agent, or Firm* — SCHWEGMAN LUNDBERG & WOESSNER, P.A.

(57) ABSTRACT

Described herein are a method and a system to monitor one or more items offered for sale by sellers in a network-based market place. In addition to the information provided by the sellers to describe the items, interested buyers may also provide their own information to further describe the items for the benefit of the buyers.

20 Claims, 14 Drawing Sheets

(56) References Cited

U.S. PATENT DOCUMENTS

| | | | |
|---|---|---|---|
| 2006/0173770 | A1 | 8/2006 | Mckay et al. |
| 2006/0200459 | A1 | 9/2006 | Ohnemus et al. |
| 2007/0078758 | A1 | 4/2007 | Susskind et al. |
| 2007/0288330 | A1 | 12/2007 | Vaid |
| 2007/0288433 | A1 | 12/2007 | Gupta et al. |
| 2008/0010148 | A1 | 1/2008 | Knibiehly et al. |
| 2008/0082394 | A1 | 4/2008 | Floyd et al. |
| 2008/0114671 | A1 | 5/2008 | Goel et al. |
| 2009/0150258 | A1 | 6/2009 | Nokes et al. |
| 2018/0253790 | A1 | 9/2018 | Nokes et al. |

OTHER PUBLICATIONS

U.S. Appl. No. 15/953,757 U.S. Pat. No. 11,107,154, filed Apr. 16, 2018, Method and System for Watching Items for Sale in an Auction System.

Decision on Appeal received for U.S. Appl. No. 11/954,004, dated Feb. 14, 2018, 8 Pages.

Examiner Answer to Appeal Brief Received for U.S. Appl. No. 11/954,004, dated Feb. 23, 2016, 8 Pages.

Final Office Action received for U.S. Appl. No. 11/954,004, dated Feb. 20, 2015, 7 pages.

Final Office Action received for U.S. Appl. No. 11/954,004, dated Nov. 26, 2013, 22 pages.

Final Office Action received for U.S. Appl. No. 11/954,004, dated Oct. 20, 2011, 14 pages.

Final Office Action received for U.S. Appl. No. 11/954,004, dated Sep. 2, 2010, 13 pages.

Final Office Action received for U.S. Appl. No. 11/954,004, dated Sep. 6, 2012, 19 pages.

Final Office Action received for U.S. Appl. No. 11/954,004, dated Sep. 10, 2013, 21 pages.

Non-Final Office Action received for U.S. Appl. No. 11/954,004, dated Apr. 9, 2013, 19 pages.

Non-Final Office Action received for U.S. Appl. No. 11/954,004, dated Apr. 29, 2011, 13 pages.

Non-Final Office Action received for U.S. Appl. No. 11/954,004, dated Aug. 20, 2014, 5 pages.

Non-Final Office Action received for U.S. Appl. No. 11/954,004, dated Mar. 30, 2010, 13 pages.

Non-Final Office Action received for U.S. Appl. No. 11/954,004, dated Mar. 30, 2012, 15 pages.

Notice of Allowance received for U.S. Appl. No. 11/954,004, dated May 9, 2014, 5 pages.

Non-Final Office Action Received for U.S. Appl. No. 15/953,757, dated Nov. 19, 2020, 18 Pages.

Notice of Allowance Received for U.S. Appl. No. 15/953,757, dated Apr. 28, 2021, 11 pages.

Restriction Requirement Received for U.S. Appl. No. 15/953,757, dated Jun. 2, 2020, 6 pages.

Auctiontamer1, "Auction Management Tool for Buyers and Seller", Tamer Solutions, Feb. 1, 2001, 5 Pages.

Auctiontamer2, Retrieved From URL <<https:/web.archive.org/web20060524183033http://www.auctiontamer.com/auction/features/htm>>, May 24, 2006, 3 Pages.

Bailey, Ainswortha. , "Consumer Awareness and Use of Product Review Websites", Journal of Interactive Advertising, vol. 6 No. 1, Sep. 2005, 15 pages.

\* cited by examiner

FIG. 7

| MY EBAY SERVICES | WATCH LIST (1 ITEMS; 100 ITEMS MAX) | | | | | |
|---|---|---|---|---|---|---|
| BUYING | ☐ TITLE | CURRENT PRICE | NUMBER OF BIDS | TIME LEFT | SELLER ID | ACTION |
| • WATCHING | ☐ 1962 10 CENTAVOS COIN PHILIPPINES (SEE ITEM SUMMER) | | | | | |
| • BIDDING | ◯ ADD NOTE? ␣␣␣␣␣ ADD NOTE ⟶705 | US $0.99 | 0 | 9D 13H | COINSELLER | PLACE BID> |
| • WON | | ⟶710 | | | | |
| • DIDN'T WIN | MY RATING: ▭▭▭▭▭▭▭▭ | | | | | |
| • ENHANCED WATCHLIST DEMO | HIGHLIGHT COLOR: WHITE ▽ ⟶715 | | | | | |
| SELLING | REMOVE SELECTED ITEMS | | | | | |
| • SELLING | | | | | | |
| • SOLD | | | | | | |
| • DIDN'T SELL | | | | | | |
| FEEDBACK PERSONAL INFORMATION EBAY PREFERENCES | | | | | | |

| | | CURRENT PRICE | NUMBER OF BIDS | TIME LEFT | SELLER ID | ACTION |
|---|---|---|---|---|---|---|
| ☐ | TITLE | | | | | |
| ☐ | 1962 10 CENTAVOS COIN PHILIPPINS (SEE ITEM SUMMER) | | | | | |
| ○ | | ADD NOTE US $0.99 | 0 | 9D 13H | COINSELLER | [PLACE BID>] |

WATCH LIST (1 ITEMS; 100 ITEMS MAX)

ADD NOTE? — 905

THIS COIN LOOKS LIKE IT HAS SOME DINGS AND SCRATCHES

CANCEL  DELETE NOTE  SAVE NOTE

MY RATING: [ ▨▨▨▨ ] — 910

HIGHLIGHT COLOR: [GREEN ▽] — 915

[REMOVE]  SELECTED ITEMS

MY EBAY SERVICES

BUYING
- WATCHING
- BIDDING
- WON
- DIDN'T WIN

- ENHANCED WATCHLIST DEMO

SELLING
- SELLING
- SOLD
- DIDN'T SELL

FEEDBACK
PERSONAL INFORMATION
EBAY PREFERENCES

MY EBAY SERVICES

BUYING
- WATCHING
- BIDDING
- WON
- DIDN'T WIN

ENHANCED WATCHLIST DEMO

SELLING
- SELLING
- SOLD
- DIDN'T SELL

FEEDBACK
PERSONAL INFORMATION
EBAY PREFERENCES

WATCH LIST (4 ITEMS; 100 ITEMS MAX)

| ☐ | TITLE | CURRENT PRICE | NUMBER OF BIDS | TIME LEFT | SELLER ID | ACTION |
|---|---|---|---|---|---|---|
| ☐ | 1962 10 CENTAVOS COIN PHILIPPINS (SEE ITEM SUMMER) | | | | | |
| | ○ THIS COIN LOOKS LIKE IT HAS SO<br>MY RATING: ▌▌▌▌▌▌▌▌▌ 1205 EDIT NOTE DELETE NOTE<br>HIGHLIGHT COLOR: GREEN ▽ | US $0.99 | 0 | 9D 13H | COINSELLER<br>99.9% POSITIVE 1225<br>ADD RATING \| REMOVE RATING | PLACE BID▷<br>1230 |
| ☐ | FENDER STRAT GUITAR (SEE ITEM SUMMER) | | | | | |
| | [guitar img] LOOKS LIKE THE CHEAP PRODUCTION<br>MY RATING: ▌▌▌▌▌▌▌▌▌ 1210 EDIT NOTE DELETE NOTE<br>HIGHLIGHT COLOR: RED ▽ | US $250.00<br>US $250.00 | 0 | 6D 22H | GUITARSELLER<br>75.2% POSITIVE<br>ADD RATING \| REMOVE RATING | PLACE BID▷ |
| ☐ | RUSH-NEIL PEART-TAMA DRUM TECHNIQUES SONG BOOK<br>(SEE ITEM SUMMER) | | | | | |
| | ADD NOTE?<br>MY RATING: ▌▌▌▌▌▌▌▌▌ 1215<br>HIGHLIGHT COLOR: WHITE ▽ | US $12.99<br>PHP 575.26*<br>US$ 13.99<br>PHP 619.55* | 0<br>BUY IT NOW | 9D 13H | COINSELLER<br>95.5% POSITIVE<br>ADD RATING \| REMOVE RATING | PLACE BID▷ |
| ☐ | PEARL SESSION CUSTOM 5 DRUMS MAPLE 100% 20,10,12,14+<br>(SEE ITEM SUMMER) | | | | | |
| | ADD NOTE?<br>MY RATING: ▌▌▌▌▌▌▌▌▌ 1220 EDIT NOTE DELETE NOTE<br>HIGHLIGHT COLOR: BLUE ▽ | US $0.99<br>PHP 43.84* | 0 | 2D 22H | PEARLSELLER<br>87.6% POSITIVE<br>ADD RATING \| REMOVE RATING | PLACE BID▷ |

REMOVE  SELECTED ITEMS

METHOD AND SYSTEM FOR WATCHING ITEMS FOR SALE IN AN AUCTION SYSTEM

CLAIM OF PRIORITY

This Application is a continuation of U.S. application Ser. No. 15/953,757, filed Apr. 16, 2018, which is a continuation of U.S. application Ser. No. 11/954,004, filed Dec. 11, 2007, each of which is hereby incorporated by reference in its entirety.

FIELD

The disclosed subject matter relates generally to the technical field of data processing and, in one example embodiment, to a system to watch for items of an electronic publishing and/or sales system.

BACKGROUND

Information items may be offered for sale using Internet web sites. The items may be offered for sale in an auction-format or in a fixed-price-format. There may be many items. Potential buyers may visit the web sites and search for items that they may be interested in buying. Some buyers may find what they want in a relatively short time. Other buyers may take time before deciding on an item.

BRIEF DESCRIPTION OF THE DRAWINGS

Embodiments are illustrated by way of example and not limitation in the figures of the accompanying drawings, in which like references indicate similar elements and in which:

FIGS. 6-12 illustrate example web pages that include interfaces that may be used by users of a network-based marketplace, in accordance with some example embodiments.

DETAILED DESCRIPTION

According to one example embodiment, a method and a system includes placing an item offered for sale in a group of one or more items to be watched for the benefit of a buyer. Each of the items in the group may be associated with ranking information set by the buyer. Each of the items in the group may also be associated with comment or notes information provided by the buyer. One or more of the ranking information and the notes information may be displayed. Other information associated with the items in the group may also be displayed.

Other features will be apparent from the accompanying drawings and from the detailed description that follows. In the following description, for purposes of explanation, numerous specific details are set forth in order to provide a thorough understanding of embodiments. It will be evident, however, to one skilled in the art that the present description may be practiced without these specific details.

In example embodiments, a computer systems (e.g., a client machine, server machine etc) configured by an application may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

I/Platform Architecture

Figure 1:
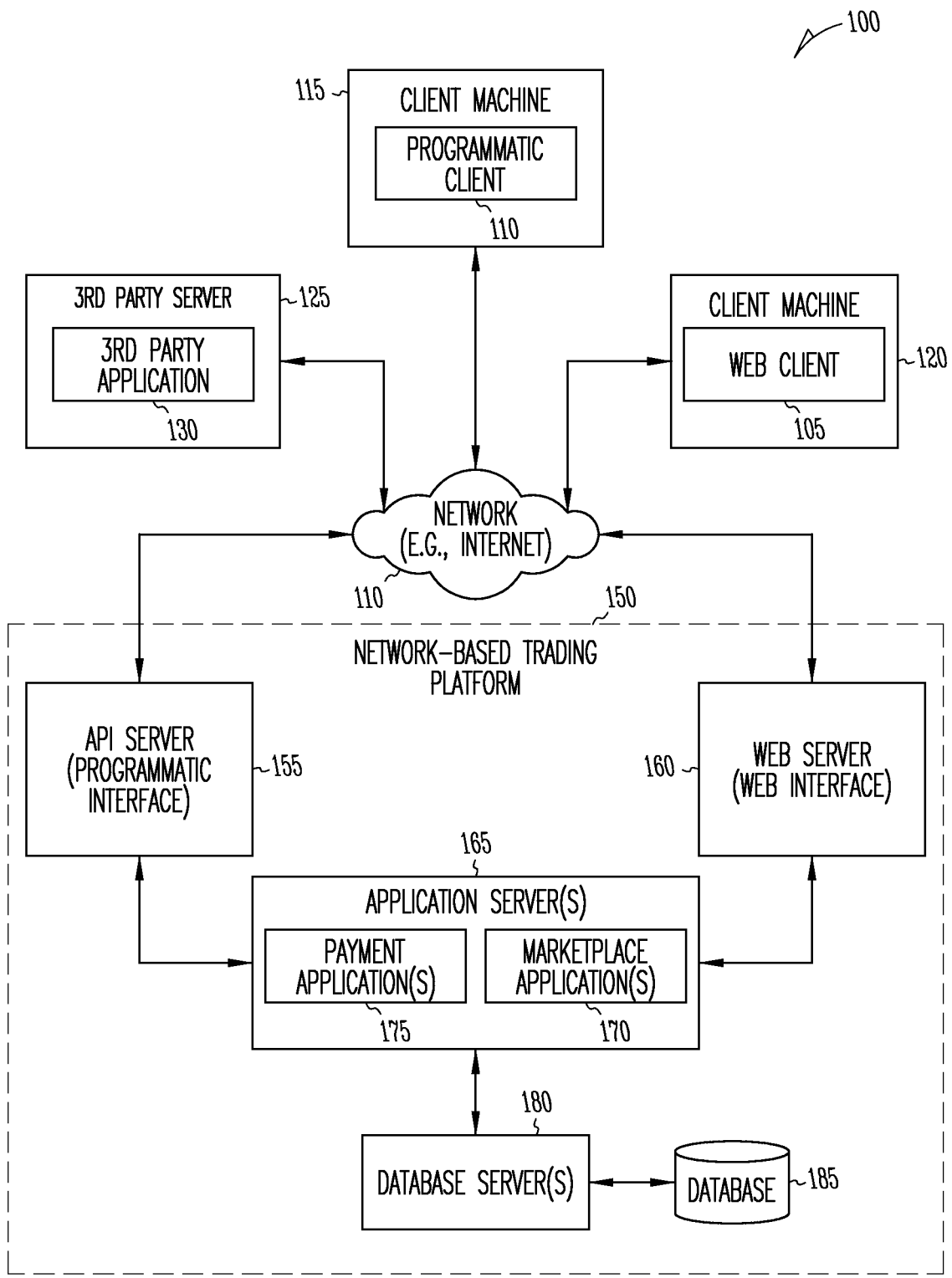
FIG. 1 illustrates a network diagram depicting a system, according to an example embodiment, having client-server architecture.

FIG. 1 illustrates an example system diagram that may be used, in accordance with some example embodiments. System 100 may include a network and may be implemented using client-server architecture. A commerce platform, in the example form of a network-based marketplace 150, may provide server-side functionality, via network 110 (e.g., the Internet) to one or more clients. FIG. 1 illustrates, for example, a web client 105 (e.g., a browser, such as the Internet Explorer® browser developed by Microsoft® Corporation of Redmond, Washington), and a programmatic client 110 executing on respective client machines 115 and 120.

The network-based marketplace 150 may include an application program interface (API) server 155 and a web server 160. The API server 155 and the web server 160 may be coupled to one or more application servers 165. The API server 155 and the web server 160 may provide programmatic and web interfaces to the one or more application servers 165. The application servers 165 may host one or more marketplace applications 170 and one or more payment applications 175. The application servers 165 may be coupled to one or more database servers 180 that facilitate access to information stored in one or more databases 185.

For some example embodiments, the marketplace applications 170 may provide a number of marketplace functions and services to users that access the network-based marketplace 150. The payment applications 175 may provide a number of payment services and functions to the users. The payment applications 175 may allow the users to quantify and accumulate value (e.g., in a commercial currency, such as the U.S. dollar, or a proprietary currency, such as "points") in accounts, and then later to redeem the accumulated value for products (e.g., goods or services) that are made available via the marketplace applications 170.

In the current example, the marketplace applications 170 and the payment applications 175 are shown in FIG. 1 to both form part of the network-based marketplace 150. It will be appreciated that, in alternative example embodiments, the payment applications 175 may form part of a payment service that is separate and distinct from the network-based marketplace 150.

In the current example, the system 100 shown in FIG. 1 employs client-server architecture. It will be appreciated that the example embodiments are of course not limited to such architecture and could equally well find applications in a distributed or peer-to-peer architecture. The marketplace applications 170 and payment applications 175 may also be implemented as standalone software programs, which do not necessarily have networking capabilities.

The web client 105 may access services and functions provided by the marketplace applications 170 and the payment applications 175 via the web interface supported by the web server 160, Similarly, the programmatic client 110 may access services and functions provided by the marketplace applications 170 and the payment applications 175 via the programmatic interface provided by the APT server 155. The programmatic client 110 may, for example, be a seller application (e.g., the TurboLister application developed by eBay Inc., of San Jose, California) to enable sellers to author and manage listings on the network-based marketplace 150 in an off-line manner and to perform batch-mode communications between the programmatic client 110 and the network-based marketplace 150.

FIG. 1 also illustrates a third party application 130, executing on a third party server machine 125, as having programmatic access to the network-based marketplace 150 via the programmatic interface provided by the API server 155. For example, the third party application 130 may, utilizing information retrieved from the network-based marketplace 150, support one or more features or functions on a website hosted by a third party. The third party website may, for example, provide one or more promotional, marketplace or payment functions that are supported by the relevant applications of the network-based marketplace 150.

Marketplace Application(s)

Figure 2:
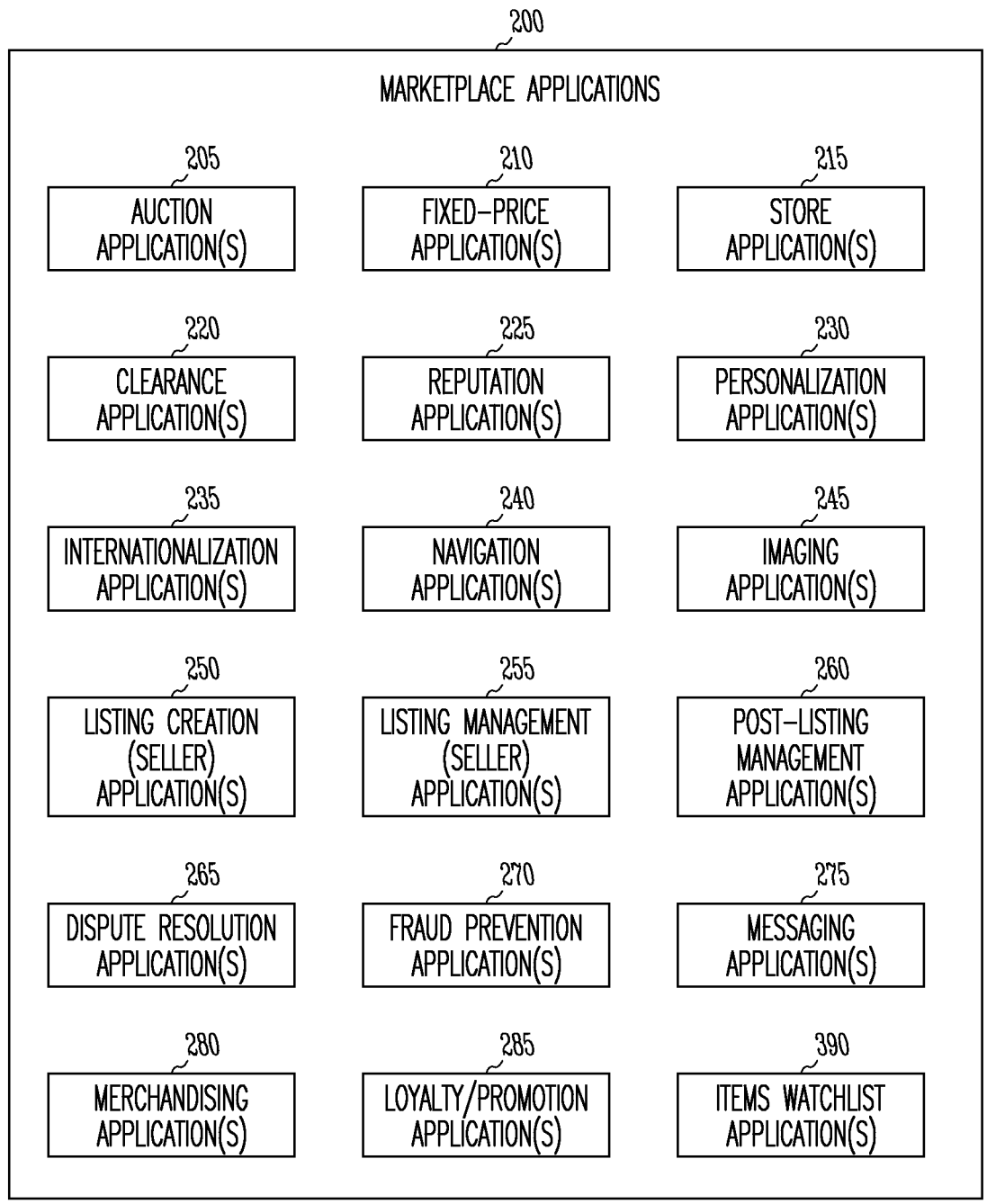
FIG. 2 illustrates a block diagram showing multiple marketplace applications that, in an example embodiment, are provided as part of a network-based marketplace.

FIG. 2 illustrates an example block diagram showing multiple marketplace applications that may be provided as part of a network-based marketplace, in accordance with some example embodiments. The network-based marketplace 150 may include various market place applications 200. The marketplace applications 200 may be related to the marketplace applications 170 illustrated in FIG. 1 and may replace the marketplace applications 170 in some example embodiments.

The marketplace applications 200 may provide a number of listing and price-setting mechanisms whereby a seller may list goods or services for sale, a buyer can express interest in or indicate a desire to purchase such goods or services, and a price can be set for a transaction pertaining to the goods or services.

The marketplace applications 200 may include one or more auction applications 205 which support auction-format listing and price setting mechanisms (e.g., English, Dutch, Vickrey, Chinese, Double, Reverse auctions, etc.). The various auction applications 205 may also provide a number of features in support of such auction-format listings, such as a reserve price feature whereby a seller may specify a reserve price in connection with a listing and a proxy-bidding feature whereby a bidder may invoke automated proxy bidding.

The marketplace applications 200 may include one or more fixed-price applications 210. The fixed-price applications 210 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with an auction-format listing, and allow a buyer to purchase goods or services, which are also being offered for sale via an auction, for a fixed-price that may be higher than the starting price of the auction.

The marketplace applications 200 may include one or more store applications 215. The store applications 215 may allow sellers to group their listings within a "virtual" store, which may be branded and otherwise personalized by and for the sellers. Such a virtual store may also offer promotions, incentives and features that are specific and personalized to a relevant seller.

The marketplace applications 200 may include one or more clearance applications 220 which may support clearance-format listing in a clearance section of the publication/sales system and price setting mechanisms. The various clearance applications 220 may also provide a number of features in support of such clearance-format listings. The clearance applications 220 may support fixed-price listing formats (e.g., the traditional classified advertisement-type listing or a catalogue listing) and buyout-type listings. For example, the clearance item may be bought for a fixed price via instant online payment in the payment application(s) 175.

The items listed in a clearance section may be set at a fixed price by the seller, in a manner similar to the fixed-price applications 210 described above. The fixed price of the item in the clearance section may be reduced over time if the item remains unsold, as designated by the seller, for example. For example, the price of the item in clearance may be reduced by a designated percentage or amount after a designated number of days have passed. The price of the item in clearance may be reduced multiple times. The price may be reduced until the item is sold or the price of the item reaches a lower limit as defined by the seller, for example. For items that are transferred from the auction section to the clearance section, the fixed price may be less than at least one of the auction listing price and the auction reserve price. The fixed price of the clearance application(s) 220 may be less than the fixed price of the fixed-price application(s) 210, if any. The items listed in the clearance section may be offered for sale for an extended duration, as defined by the seller for example.

The clearance applications 220 may not be generally offered in conjunction with an auction-format listing. The clearance applications 220 may allow a buyer to purchase goods or services for a fixed-price that may be priced at or below market value.

The marketplace applications 220 may include one or more reputation applications 225. The reputation applications 225 may allow parties that transact utilizing the network-based marketplace 150 to establish, build, and maintain reputations, which may be made available and published to potential trading partners. Consider that where, for example, the network-based marketplace 150 supports person-to-person trading, users may have no history or other reference information whereby the trustworthiness and credibility of potential trading partners may be assessed. The reputation applications 225 may allow a user, for example through feedback provided by other transaction partners, to establish a reputation within the network-based marketplace 150 over time. Other potential trading partners may then reference such a reputation for the purposes of assessing credibility and trustworthiness.

The marketplace applications 200 may include one or more personalization applications 230. The personalization applications 230 allow users of the network-based marketplace 150 to personalize various aspects of their interactions with the network-based marketplace 150. For example a user may, utilizing an appropriate personalization application(s) 230, create a personalized reference page at which information regarding transactions to which the user is (or has been) a party may be viewed. Further, a personalization application 230 may enable a user to personalize listings and other aspects of their interactions with the network-based marketplace 150 and other parties.

For some example embodiments, the marketplace applications 200 may include international application(s) 235. The international application(s) 235 may be used by the network-based marketplace 150 to support a number of marketplaces that are customized for specific geographic regions. For example, there may be a version of the network-based marketplace 150 customized for the United Kingdom, and there may be another version of the network-based marketplace 150 customized for the United States. Each of these versions may operate as an independent marketplace, or they may be customized (or internationalized) presentations of a common underlying marketplace.

The navigation applications 240 may facilitate navigating of the network-based marketplace 150. For example, a search module may enable key word searches of listings published via the network-based marketplace 150. A browse module may allow users to browse various category, catalogue, or inventory data structures according to which listings may be classified within the network-based marketplace 150. Various other navigation applications may be provided to supplement the search and browse modules.

In order to make listings, available via the network-based marketplace 150, as visually informing and attractive as possible, the marketplace applications 200 may include one or more imaging applications 245. Users may upload images for inclusion within listings. An imaging application 245 may also operate to incorporate images within viewed listings. The imaging applications 245 may also support one or more promotional features, such as image galleries that are presented to potential buyers. For example, sellers may pay an additional fee to have an image included within a gallery of images for promoted items.

The marketplace applications 200 may include one or more listing creation applications 250. The listing creation applications 250 may allow sellers conveniently to author listings pertaining to goods or services that they wish to transact via the network-based marketplace 150.

Listing management applications 255 may allow sellers to manage such goods or services listings. Specifically, where a particular seller has authored and/or published a large number of listings, the management of such listings may present a challenge. The listing management applications 255 may provide a number of features (e.g., auto-relisting, inventory level monitors, etc.) to assist the seller in managing such listings.

One or more post-listing management applications 260 also assist sellers with a number of activities that typically occurs post-listing. For example, upon completion of an auction facilitated by one or more auction applications 205, a seller may wish to leave feedback regarding a particular buyer. To this end, a post-listing management application 260 may provide an interface to one or more reputation applications 225, so as to allow the seller conveniently to provide feedback regarding multiple buyers to the reputation applications 225. As another example, upon completion of an auction where the goods or services has not sold, the item may automatically be relisted in the auction application(s) 205 and/or the fixed-price application(s) 210, or the item may be automatically listed in the clearance application(s) 220.

The marketplace applications 200 may include dispute resolution applications 265. The dispute resolution applications 265 provide mechanisms whereby disputes arising between transacting parties may be resolved. For example, the dispute resolution applications 265 may provide guided procedures whereby the parties are guided through a number of steps in an attempt to settle a dispute. In the event that the dispute cannot be settled via the guided procedures, the dispute may be escalated to a third party mediator or arbitrator.

The marketplace applications 200 may include fraud prevention applications 270. A number of fraud prevention applications 270 implement various fraud detection and prevention mechanisms to reduce the occurrence of fraud within the network-based marketplace 150.

The marketplace applications 200 may include messaging applications 275. The messaging applications 275 are responsible for the generation and delivery of messages to users of the network-based marketplace 150. Such messages, for example, advise users regarding the status of listings at the network-based marketplace 150 (e.g., providing "outbid" notices to bidders during an auction process or to provide promotional and merchandising information to users).

The marketplace applications 200 may include merchandising applications 280. The merchandising applications 280 may support various merchandising functions that are made available to sellers to enable sellers to increase sales via the network-based marketplace 150. The merchandising applications 280 also operate the various merchandising features that may be invoked by sellers, and may monitor and track the success of merchandising strategies employed by sellers.

The network-based marketplace 150 itself, or one or more parties that transact via the network-based marketplace 150, may operate loyalty programs that are supported by one or more loyalty/promotions applications 285. For example, a buyer may earn loyalty or promotions points for each transaction established and/or concluded with a particular seller, and may be offered a reward for which accumulated loyalty points can be redeemed.

The marketplace applications 200 may include items watch list applications 290. The items watch list applications 290 may support various functions related to watching for items made available by the auction applications 205, the fixed price applications 210, the clearance applications 220, and any other applications that may make available merchandises and/or services so that they can be purchased by the buyers via the network-based marketplace 150. The items watch list applications 290 may provide various functions including functions that enable the buyers to watch, monitor, keep track, rank, provide notes, and highlight one or more items that the buyers may be interested in buying.

Even though the context of this description is with regard to marketplace applications, it is to be understood by those of skill in the art that the described subject matter may also be applicable to other types of applications for various types of transactions. The transactions may include those between a single seller and a single buyer or may include those between a single seller and multiple buyers, and may include selling a catalog-type product, or even a more unique product.

Data Structures

Figure 3:
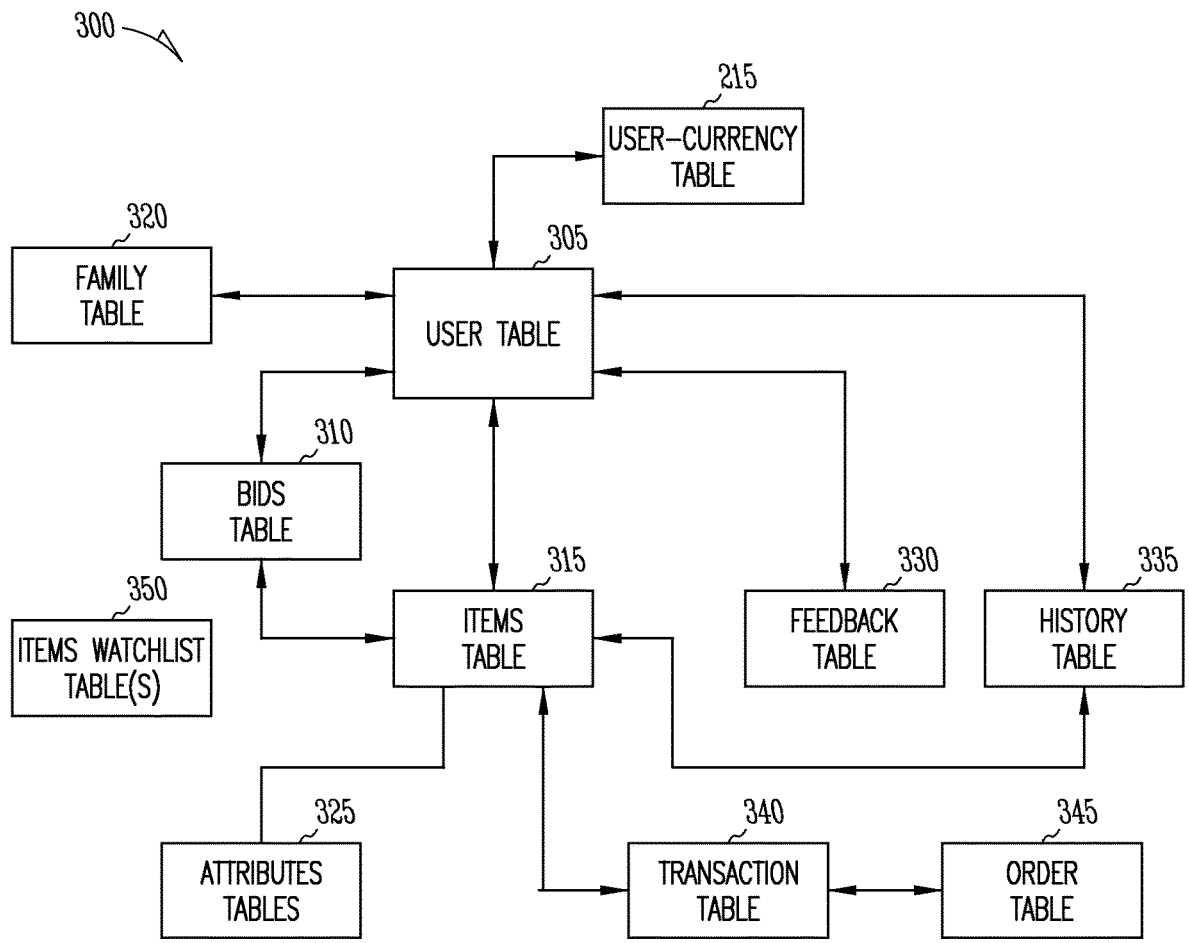
FIG. 3 illustrates a high-level entity-relationship diagram, illustrating various tables that may be maintained within databases, and that are utilized by and support the marketplace and payment applications, according to an example embodiment.

FIG. 3 illustrates an example entity-relationship diagram, illustrating various tables that may be used, in accordance to some example embodiments. Tables 300 may be maintained in the databases 185 and may be utilized by and may support the marketplace applications 170 and the payment applications 175 (illustrated in FIG. 1).

The tables 300 may include a user table 301. The user table 301 may contain a record for each registered user of the network-based marketplace 150. The user table 301 may also include identifier, address and financial instrument information pertaining to each such registered user. A user may operate as a seller, a buyer, or both, within the network-based marketplace 150. In an example embodiment, a buyer may be a user that has accumulated value (e.g., commercial or proprietary currency), and is then able to exchange the accumulated value for items that are offered for sale by the network-based marketplace 150.

The tables 300 may also include an items table 305 in which are maintained item records for goods and services that are available to be, or have been, transacted via the network-based marketplace 150. Each item record within the items table 305 may furthermore be linked to one or more user records within the user table 301, so as to associate a seller and one or more actual or potential buyers with each item record.

The tables 300 may include a transaction table 340. The transaction table 340 may contain a record for each transaction (e.g., a purchase transaction) pertaining to items for which records exist within the items table 305.

The tables 300 may include an order table 345. The order table 345 may be populated with order records, each order record being associated with an order. Each order may be associated with one or more transactions for which records may exist within the transactions table 340.

The tables 300 may include a bids table 310. Bid records within the bids table 310 each relate to a bid received at the network-based marketplace 150 in connection with an auction-format listing supported by the auction application(s) 205.

The tables 300 may include a feedback table 330. The feedback table 330 may be utilized by one or more reputation applications 225, in some example embodiments, to construct and maintain reputation information concerning users.

The tables 300 may include a history table 335. The history table 335 may maintain a history of transactions to which a user has been a party.

The tables 300 may include one or more attributes tables 325. The attributes tables 325 may record attribute information pertaining to items for which records exist within the items table 305. Considering a single example of such an attribute, the attributes tables 325 may indicate a currency attribute associated with a particular item. The currency attribute may identify the currency of a price for the relevant item as specified by a seller.

Family table 320 and user-currency table 315 may be used to support related products and multiple currencies in transactions.

The tables 300 may include items watch list tables 350. The items watch list tables 350 may include information pertaining to items for which the buyers may be interested in but may not yet be ready to engage into a transaction with the seller of the item. For example, the buyer may be shopping for a similar time but want to wait for a better price, quality, etc. In these situations, the buyer may select an option (e.g., watch this item selection) to place information associated with the item into a list of items to watch (also referred to as a watch list).

Items Watch List Applications

Figure 4:
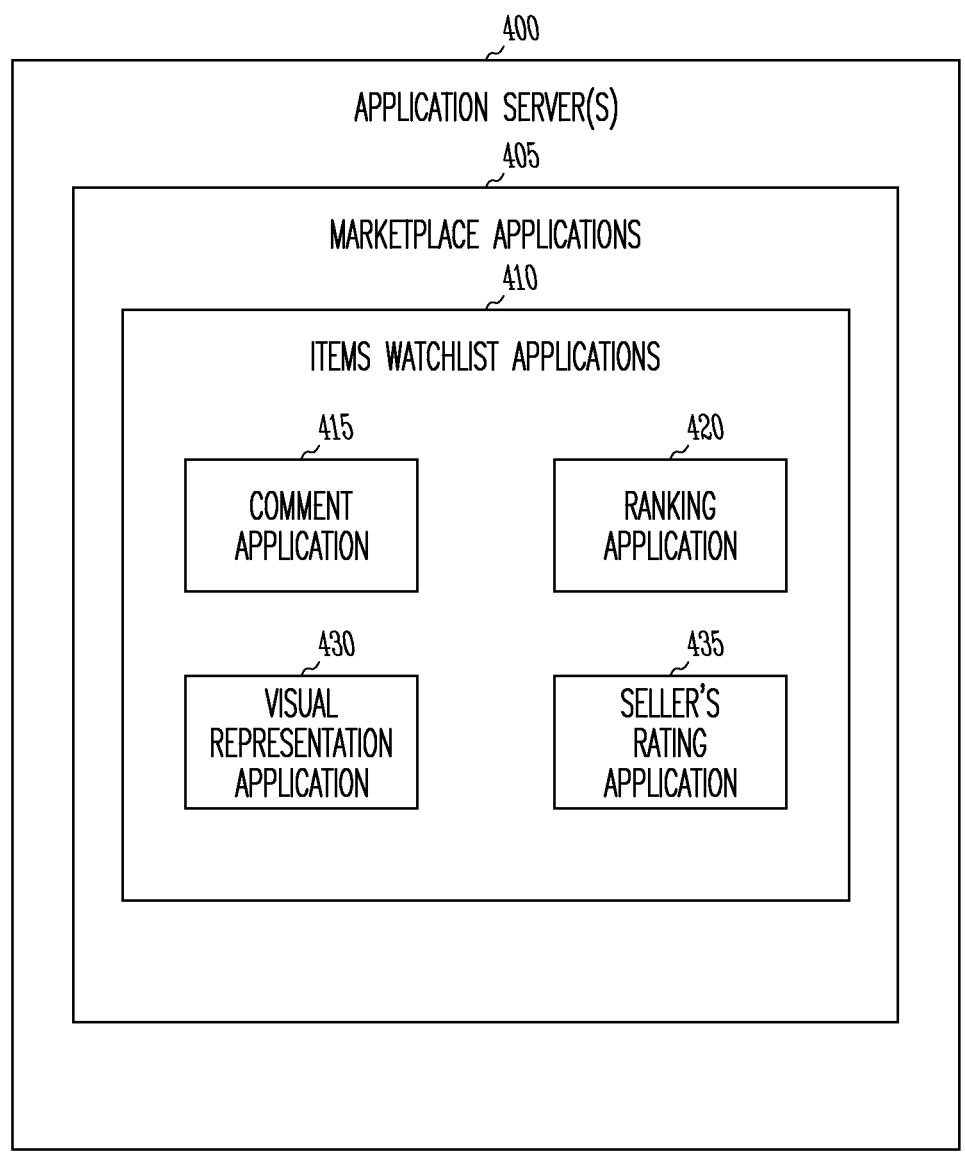
FIG. 4 is an example diagram that illustrates items watch list applications, in accordance with some example embodiments.

FIG. 4 is an example diagram that illustrates items watch list applications, in accordance with some example embodiments. Items watch list applications 410 may be part of the marketplace applications 405 which, in turn, may be included in the application servers 400. The application servers 400, the marketplace applications 405, and the items watch list applications 410 may be related to the application servers 165 (illustrated in FIG. 1), the marketplace applications 170 (illustrated in FIG. 1) and 200 (illustrated in FIG. 2), and the items watch list applications 290 (illustrated in FIG. 2), respectively, and may replace them in certain environments.

A watch list may be in a form of a web page interface that may include a listing of items that a buyer or a user of the network-based market place 150 may want to watch or monitor. The watch list may be used as a temporary holding place to give the buyer or user more time to decide. An item in the watch list may be dynamically removed when the item is sold or no longer available. An item in the watch list may also be removed by the buyer if the buyer or user is no longer interested. The watch list may be empty, or it may include multiple items to be watched.

In general, each of the items in the watch list may be associated with information provided by a seller. For example, the information from the seller may include description information and price information. For some example embodiments, each of the items in the watch list may include information provided by a buyer.

Referring to FIG. 4, for some example embodiments, the items watch list applications 410 may include comments/notes application 415, ranking application 420, visual representation application 430, and seller's feedback application 435. The applications included in the items watch list applications 410 may enable a buyer to provide customized information and to associate the customized information with the one or more items included in the watch list. It may be noted that the customized information may be in addition to the information provided by the sellers that offer the items.

The comments/notes application 415 may enable a buyer to provide comments/notes information that may enhance the descriptions of an item for the benefit of the buyer. Consider an example when a buyer is watching a ticket item being offered for sale by a seller. The seller may describe the ticket as "great seat, center stage", and the description may be accurate. However, the description may lack information about a particular row within the center stage. A buyer who is interested in a ticket for a seat within the first ten rows in the center stage may not be very interested in a ticket that is in row 100 if there are still opportunities to be a ticket for a seat near the front row. In this example, the buyer may provide comments/notes such as, for example, "seat in row 100, too far for now but may consider if no better choice becomes available". The buyer may then continue to search for a better ticket.

The comments/notes application 415 may also enable a buyer to provide comments/notes information that the buyer may consider to be relevant. For example, the buyer may provide comments/notes such as "Good experience with this seller in another transaction" to indicate that this seller can be trusted to carry out the transaction if the buyer decides to proceed at a subsequent time. It may be appreciated to recognize that the comments/notes application 415 may enable the buyer to provide any general or specific comments. The comments/notes application 415 may also enable the buyer to edit the comments/notes and to remove or delete the comments/notes. A buyer may choose not to provide any comments/notes.

The ranking application 420 may enable a buyer to rank items in the watch list. When there are multiple items, it may be advantageous to rank the items according to the buyer's preference. The ranking application 420 may enable the buyer to specify a numeric ranking (e.g., 1 to 10), a graphical ranking (e.g., a color bar), or any other types of ranking methods and their combinations. The ranking application 420 may also include options to enable a buyer to sort the items in the watch list according to their rankings. For example, the ranking application 420 may enable the buyer to sort according to a sequence starting with a lowest rank item or a sequence starting with a highest rank item.

The visual representation application 430 may enable a buyer to associate an item with some visual representation. For example, the buyer may change a color background of a display area associated with an item in the watch list. There may be options to have different visual representations. The visual representation application 430 may enable the buyer to group related items. For example, the items highlighted in green may relate to personal interests, while those highlighted in blue may relate to work interests, etc.

The seller's rating application 435 may enable a buyer to associate an item with feedback or rating information of the seller that is offering the item. The seller's rating information may be provided by the reputation applications 225 illustrated in FIG. 2. By associating the seller's rating information with an item on the watch list, the buyer may be able to consider the seller's rating before deciding to buy the item. For example, when there are multiple similar items on the watch list, the buyer may decide to buy an item from a seller who has a better rating even though the price asked by that seller may be higher than the other sellers.

Figure 5:
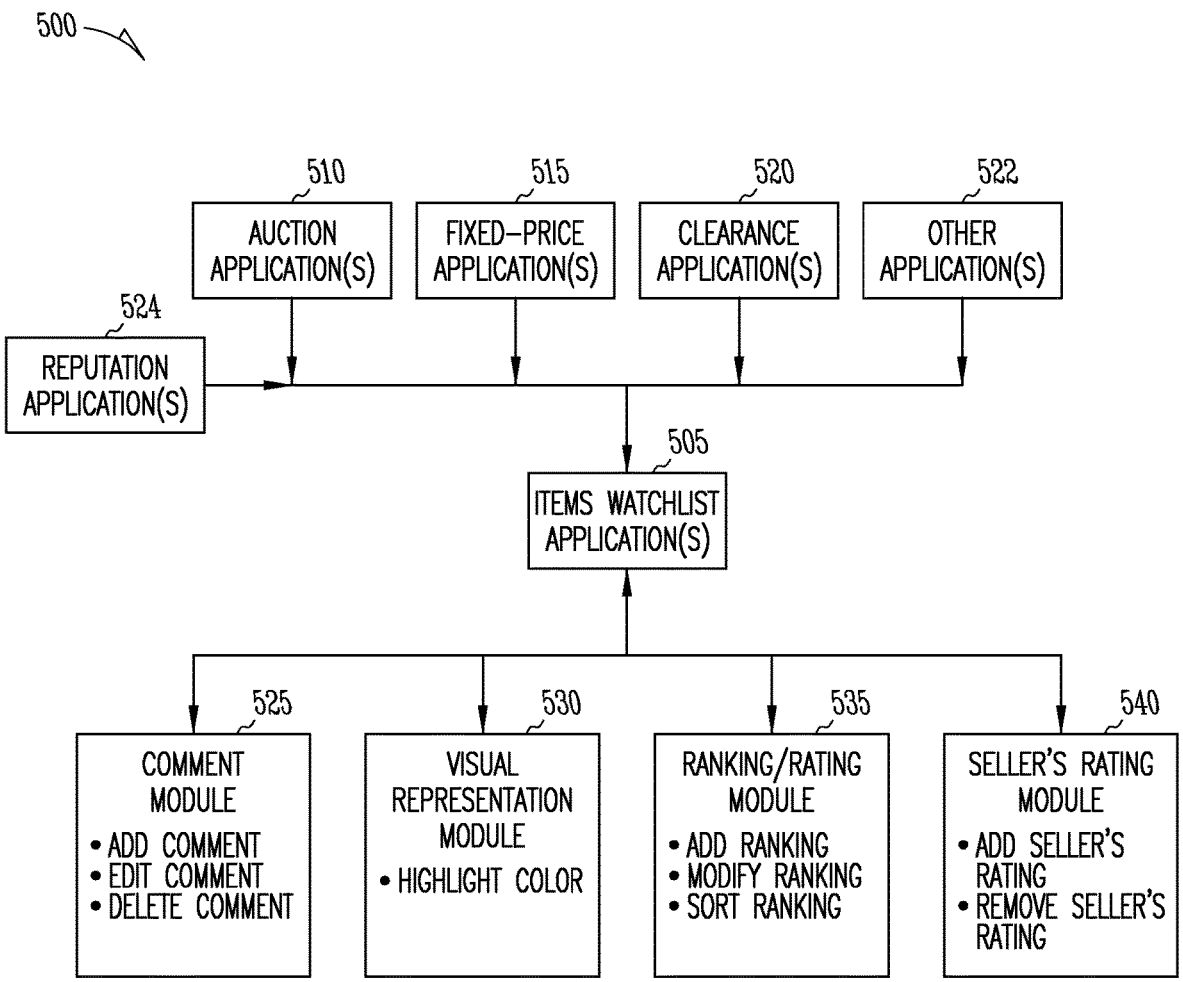
FIG. 5 illustrates an example block diagram that includes various modules that may be interact with items watch list applications, in accordance with some example embodiments.

FIG. 5 illustrates an example block diagram that includes various modules that may be interact with items watch list applications, in accordance with some example embodiments. Items watch list applications 505 may receive information about items offered for sale from the auction applications 510, the fix-price applications 515, the clearance applications 520, and from any other applications that may relate to the generation of listings of items offered for sale in the network-based marketplace 150.

For some example embodiments, the items watch list applications 505 may also receive seller's rating information from the reputation applications 524. The items watch list applications 505, the auction applications 510, the fix-price applications 515, the clearance applications 520, and the reputation applications 524 may be related to corresponding applications illustrated in FIG. 2 and may replace them in certain environments.

For some embodiments, the items watch list applications 505 may interact with comments/notes module 525, a visual representation module 530, ranking module 535 and seller's rating module 540. One or more of the modules 525-540 may be independent from and linked to by the items watch list applications 505. Alternatively, they may all be included in the items watch list applications 505.

The comments/notes module 525 may include functions that enable a buyer to add comment/notes, to edit comment/notes, and to delete comment/notes that is associated with an item in the watch list. For some example embodiments, an input area may be displayed responsive to a buyer initiating a request to create or add comments/notes. The input area may allow the buyer to enter one line or multiple lines of comments/notes. For some example embodiments, only the first line of the comments/notes may be displayed in a comment area, and the entire comments/notes may be displayed when a cursor is positioned over the comment area.

The visual representation module 530 may include functions that enable a buyer to highlight an item in the watch list so that it may be easily recognized. For example, a buyer may highlight a background associated with an item in one of different colors. As another example, a buyer may also highlight several items in the same color to group related items.

The ranking module 535 may include functions that enable a buyer to add ranking information, modify the ranking information, and sort the ranking information associated with an item in the watch list. For example, the buyer may select an option to request for the ranking information to be displayed. Initially, the items in the watch list may be ordered according to a time when the item is placed into the watch list. When there is no assigned ranking, a default ranking may be used. The default ranking may then be modified by the buyer. The items in the watch list may then be sorted according to a sequence specified by the buyer.

Figure 6:
Figure 8:

The seller's rating module 540 may include functions that enable a buyer to add seller's rating and to remove the seller's rating. For example, responsive to receiving the buyer selecting an option to add a seller's rating, the items watch list applications 505 may communicate with the reputation applications 524 to retrieve and to display the seller's rating information, User Interface FIGS. 6-12 illustrate example web pages that include interfaces that may be used by users of a network-based marketplace, in accordance with some example embodiments. FIG. 6 illustrates an example of web page interface 600 that includes information about an item that may be offered for sale. The web page interface 600 includes price information, seller's information, etc. it may also be noted that the web page 600 also includes "watch this item" selectors or links 605 and 610 which may enable a buyer to place the item into a watch list associated with the buyer. In the current example, the web page 600 also includes a seller's rating information 615. This seller's rating information may optionally be added into the watch list if the buyer decides to do so. It may be noted that the web page interface 600 may be visible to any buyer who views the information associated with an item offered for sale. A buyer may or may not select the "watch this item" selectors or links 605 or 610. The web page interface 600 may be referred to as a first network-based interface.

FIG. 7 illustrates an example of web page interface 700 that may be used to display information about the items included in a watch list, in accordance with some example embodiments. The web page interface 700 may include a comment area 705 and a rating area 710. The comment area 705 includes a window to display any comments/notes that the buyer may have provided. When there is no comment, the comment area 705 may include a blank window as illustrated in the current example. Alternatively, when there is no comment, the comment area 705 may not be visible.

For some example embodiments, rating area 710 may display a numeric rating. For some other example embodiments, the rating area 710 may display a graphical representation that may be equivalent to a numeric rating. For example, the rating area 710 may initially be entirely in a light color to represent that there is no rating assigned by the buyer. The rating of an item may be referred to as item rating information. When a rating is assigned, portion of the rating area 710 may be changed to a bold color (e.g., black, red, etc) to reflect the appropriate rating. For example, using a rating scale from 1 to 10, when the buyer assigns a rating of 5, half of the rating area 710 may be in a bold color. This is illustrated in the example web page interface 800 of FIG. 8 as the example rating area 805.

For some embodiments, highlight area 715 may be used to highlight the display area associated with an item. The highlight area 715 may include a selector to enable a buyer to select a highlight mode. The highlight mode may be associated with colors, patterns, or with any forms of visual representation. In the current example, the highlight mode is based on colors, and a buyer may be able to activate a pull down menu to select one of various available colors the current example, the highlight color is white. In the example web page interface 800, the highlight color of the highlight area 810 is green.

FIG. 9 illustrates an example of web page interface 900 that may be used to add comments/notes for items included in a watch list, in accordance with some example embodiments. The web page interface 900 may include a comment input area 905. The comment input area 905 may enable a buyer to provide one or multiple lines of comments/notes. The comment input area 905 may also include options to enable the buyer to cancel, delete and save the comment currently displayed in the comment input area 905. Similar to the web page interface 800, the web page interface 900 may also include a rating area 910 and a highlight area 915.

Figure 10:
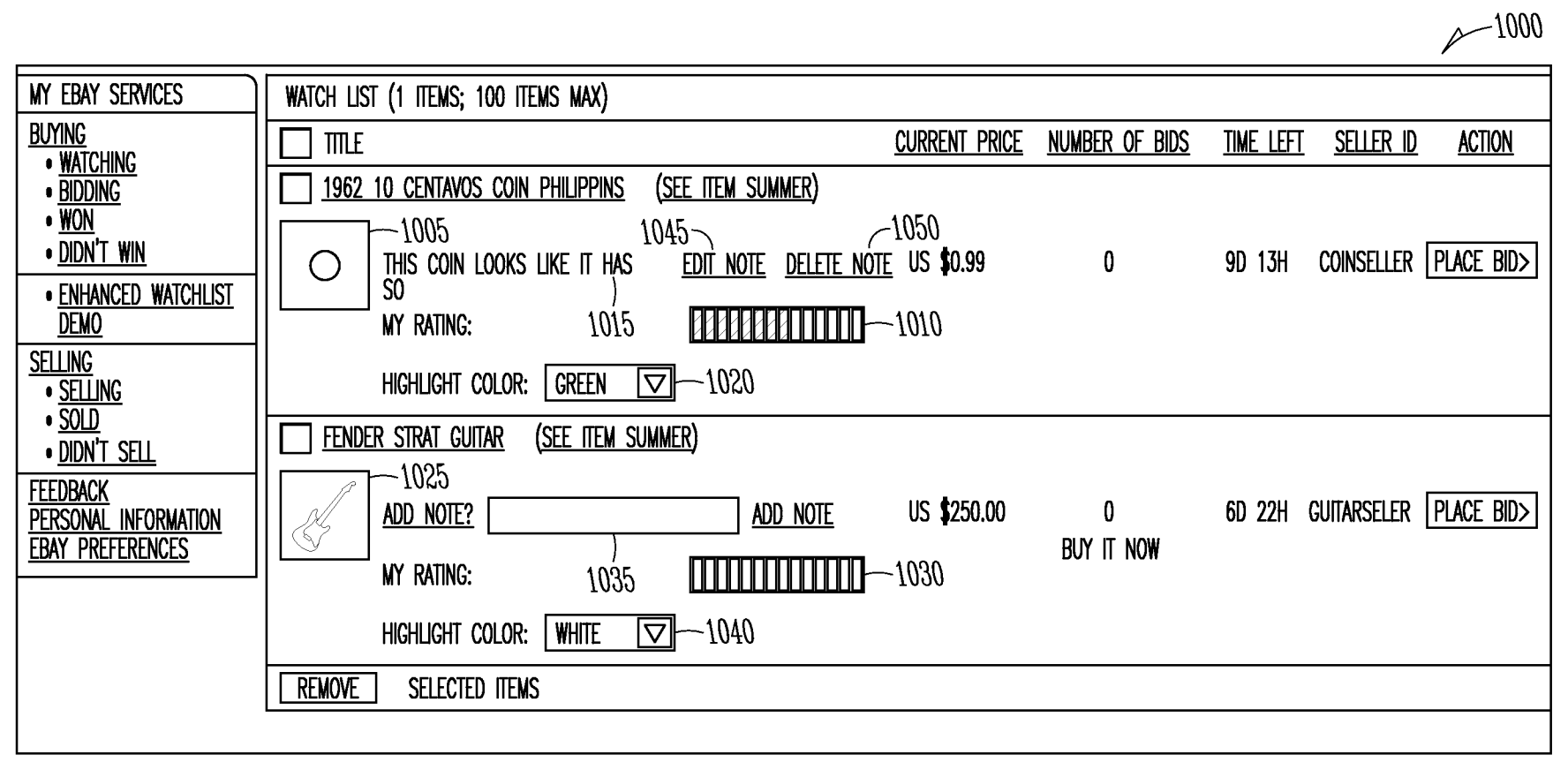
Figure 11:
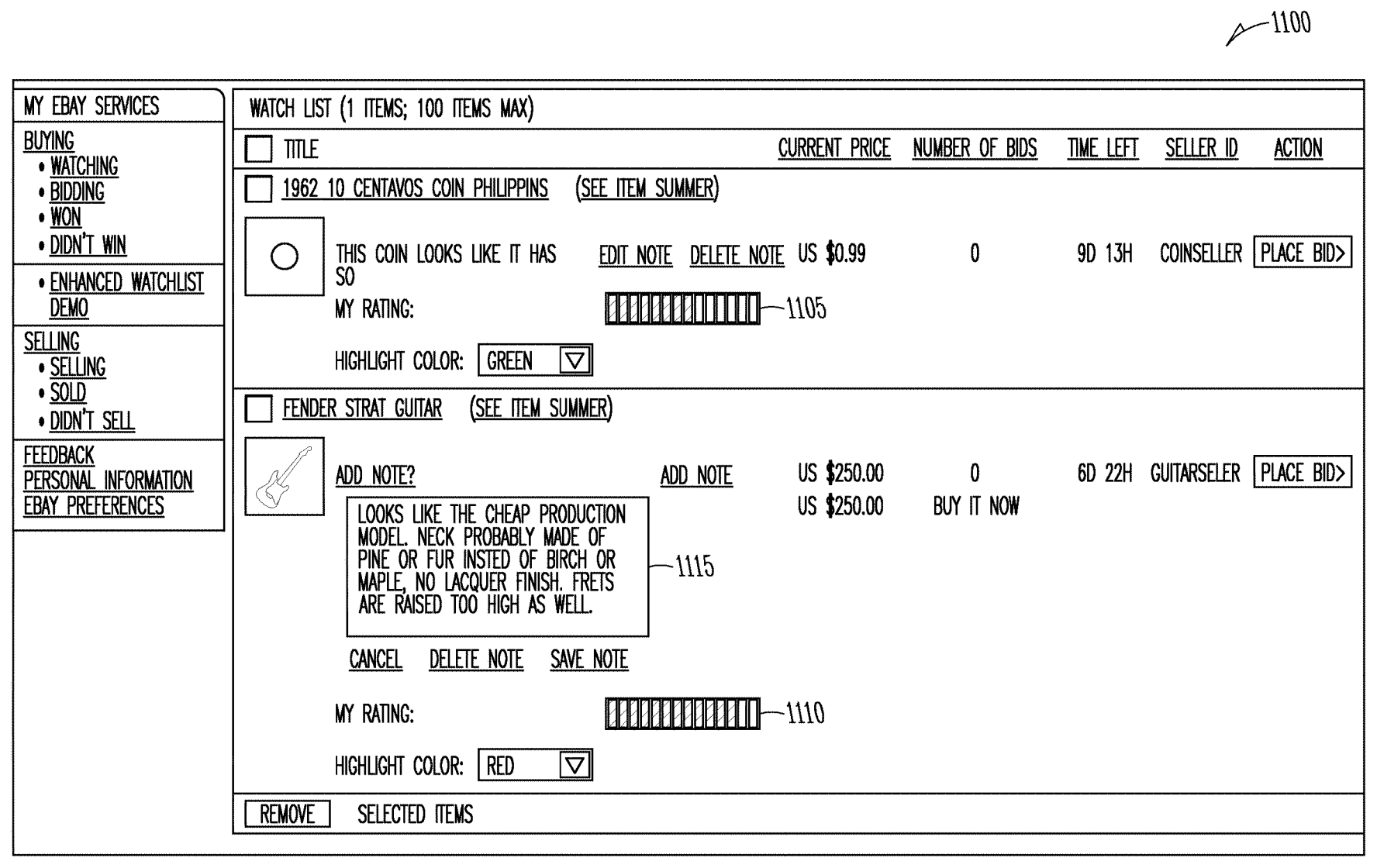

FIG. 10 illustrates an example of web page interface 1000 that may be used to display multiple items on a watch list, in accordance with some example embodiments. The web page interface 1000 may include information similar to those previous illustrated in FIGS. 7-9 including the rating areas 1010 and 1030, the highlight areas 1020 and 1040, the comment areas 1015 and 1035. The example web page interface 1000 also includes option to edit the comment 1045 and an option to delete the comment 1050. It may be noted that the example web page 1000 displays two items 1005 ("coin") and 1025 ("guitar") on the watch list. The item 1025 may be an item that has just been added to the watch list, and as such, it may not have any associated comments/notes in the comment area 1035 or assigned rating in the rating area 1030. A buyer may add comments/notes to the item 1025 by selecting the add note option 1032 which may open a comment input area 1115, as illustrated in the example web page interface 1100 of FIG. 11. The buyer may also assign a rating to the item 1025 by updating the rating area 1030. For example, the buyer may place a cursor pointer over the rating area 1030 and press a right button of a mouse to increase the item rating information. Decreasing the item rating information may be performed by placing the cursor pointer over the rating area 1031 and press a left button of the mouse. Other techniques may also be used to change or modify the item rating information. In the current example, the rating of the item 1025 may be assigned and illustrated as the rating area 1110 of the example web page 11000 of FIG. 11.

FIG. 12 illustrates an example of web page interface 1200 that may be used to display multiple items on a watch list along with sellers' rating information, in accordance with some example embodiments. The web page interface 1200 may include information similar to those previous illustrated in FIGS. 7-11 including the rating areas 1205, 1210, 1215 and 1220. The example web page interface 1200 may also include seller's rating information 1222. For some example embodiments, when an item is added to the watch list, the seller's rating information may not be displayed. A buyer may add the seller's rating information by using the rating selector 1225. The buyer may also remove the seller's rating information by using the remove rating selector 1230. For some embodiments, there may be an option to enable the buyer to sort the items in the watch list based on the sellers' ratings. Other techniques to add or to remove the seller's rating may also be used. One or more of the web page interfaces 700, 800, 900, 1000, 1100 and 1200 may be referred to as a second network-based interface.

For some example embodiments, the items watch list applications (e.g., adding comments, ranking items, highlighting items, adding seller's rating, sorting the items, etc.) may be written using a combination of one or more technologies that include, for example, Dynamic Hyper Text Markup Language (DHTML), Asynchronous JavaScript and XML (AJAX), FLASH™, HTML, Flex, Active X, Java applet technologies.

Process

Figure 13:
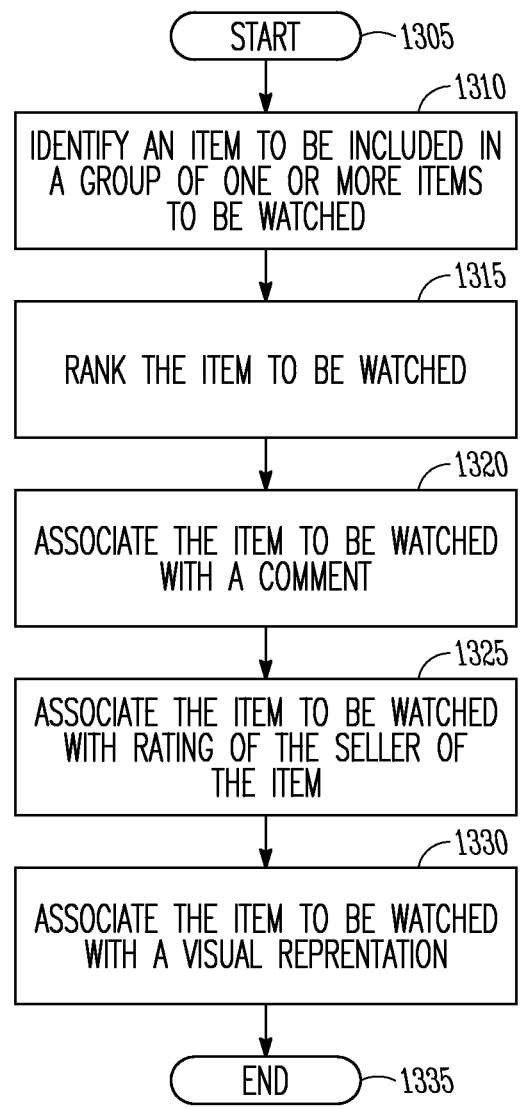
FIG. 13 illustrates an example process that may be used to implement the methods described, in accordance with some example embodiments.

FIG. 13 illustrates an example process that may be used to implement the methods described, in accordance with some example embodiments. The process may be performed by applications within the network-based applications 150. The applications may be the items watch list application 505 illustrated in the example of FIG. 5. The process may be performed in response to an action performed by a buyer. The process may start at block 1305. At block 1310, one or more items may be identified as the items to be placed in the watch list. These may be the items that a buyer may be interested in but may need more time to decide. For example, the buyer may select the "watch this item" selector or link 605 or 610 illustrated in FIG. 6.

At block 1315, a ranking may be assigned to the item. For example, this may be in response to the buyer specifying a numeric ranking or a graphical representation of a numeric ranking in the ranking area 805 illustrated in FIG. 8. Other ranking techniques may also be used.

At block 1320, comments/notes information may be associated with the item. For example, this may be in response to the buyer providing and saving comments/notes in the comment input area 1115 described in FIG. 11. It may be noted that the comments/notes provided by the buyer may be in addition to the description provided by the seller of the item.

At block 1325, seller's rating information may be associated with the item. For example, this may be in response to the buyer selecting the rating selector or link 1225 illustrated in FIG. 12. The seller's rating information may already exist and may be provided by the reputation applications 225 illustrated in FIG. 2.

At block 1330, visual representation may be associated with the item. For example, this may be in response to the buyer selecting an option in the highlight area 1040 illustrated in FIG. 10. It may be noted that the highlighting may be performed using colors. Alternatively, it may be performed using patterns or any other forms of highlighting. When there are multiple items in the watch list, using the visual representation may help the buyer to, for example, easily recognize an item that may be more important to the buyer than the others. The process may end at block 1335.

Computer System

Figure 14:
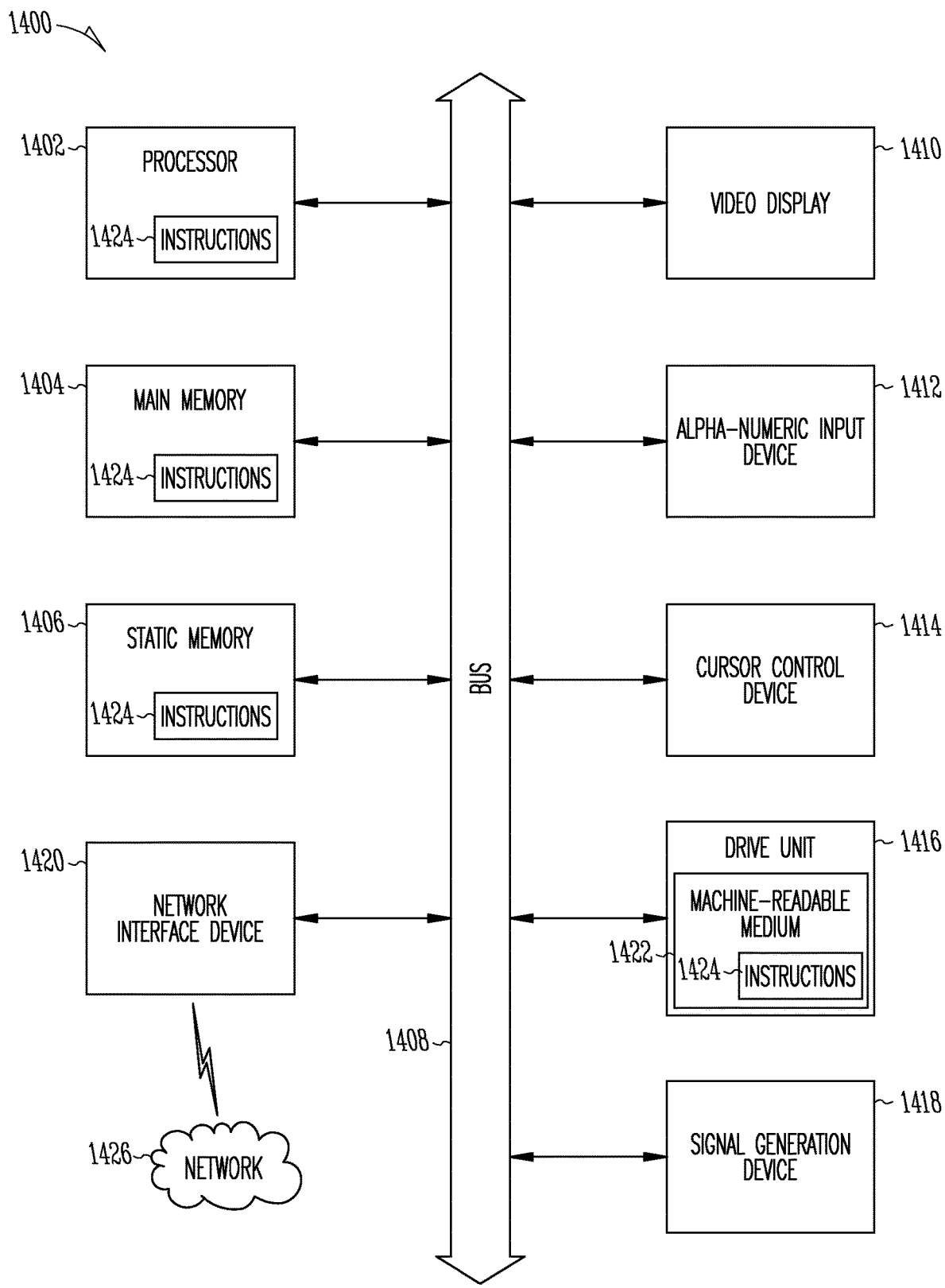
FIG. 14 illustrates a diagrammatic representation of a machine in the form of a computer system within which a set of instructions, for causing the machine to perform any one or more of the methodologies discussed herein, may be executed, according to an example embodiment.

FIG. 14 illustrates an example diagram of a representation of a machine in the example form of a computer system that may be used, in accordance with some example embodiments. Set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed)

network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 1400 may include a processor 1402 (e.g., a central processing unit (CPU), a graphics processing unit (GPU), or both), a main memory 1404 and a static memory 1406, which communicate with each other via a bus 1408, The computer system 1400 may further include a video display unit 1410 (e.g., liquid crystals display (LCD) or a cathode ray tube (CRT)). The computer system 1400 also includes an input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., software 1424) embodying any one or more of the methodologies or functions described herein. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

The instructions 1424 may further be transmitted or received over a network 1426 via the network interface device 1420.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

It may be appreciated that FIGS. 1-14 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the description, with each claim standing on its own as a separate embodiment.

Thus, a method and system to collectively watch items offered for sale have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A computer-implemented method, comprising:
providing, to a first computing device, a first user interface comprising first item information related to a listing of a first item in a network-based publication application;
receiving, via the first user interface, a selection of the first item;
providing, to the first computing device, a second user interface comprising second item information related to a listing of a second item in the network-based publication application;
receiving, via the second user interface, a selection of the second item;
in response to receiving the selection of the first and second items, providing, to the first computing device, a monitoring user interface that consolidates the first and second item information, the monitoring user interface comprising a first interactive rating graphical user area corresponding to the first item, and a second interactive rating graphical user area corresponding to the second item; and
dynamically updating a display order of the first and second items in the monitoring user interface based on a first value associated with the first interactive rating graphical user area and a second value associated with the second interactive rating graphical user area without the first computing device accessing the first user interface and the second user interface subsequent to receiving the selection of the first and second items.

2. The computer-implemented method of claim 1, wherein the first item information identifies a first user account, a first price item attribute, and a first remaining time attribute,
wherein the second item information identifies a second user account, a second price item attribute, and a second remaining time attribute.

3. The computer-implemented method of claim 2, wherein the first interactive rating graphical user area comprises a first adjustable element indicating a first item rating information that corresponds to a relative preference of a user of the first computing device for the first item,
wherein the second interactive rating graphical user area comprises a second adjustable element indicating a second item rating information that corresponds to a relative preference of the user of the first computing device for the second item.

4. The computer-implemented method of claim 1, further comprising:
dynamically updating the monitoring user interface based on updated first and second item information without the first computing device accessing the first user interface and the second user interface subsequent to receiving the selection of the first and second items.

5. The computer-implemented method of claim 1, wherein the monitoring user interface further indicates:
first user rating information of a first user account of a first user account associated with the first item; and
second user rating information of a second user account of a second user account associated with the second item.

6. The computer-implemented method of claim 5, wherein updating the display order of the first and second items further comprises:
adjusting a display order of the first and second items in the monitoring user interface based on the first user rating information and the second user rating information.

7. The computer-implemented method of claim 5, further comprising:
accessing a user table, an items table, and a transaction table that operate to implement transactions for items, the user table including records for users of the network-based publication application, the items table including records for items that are transacted in the network-based publication application, and the transaction table including records for transactions of items between the users in the network-based publication application; and
updating the first and second item information based on the user table, the items table, and the transaction table; and
adjusting the monitoring user interface based on the updating.

8. The computer-implemented method of claim 7, further comprising:
determining that the first item listed by the first user account is no longer available in the network-based publication application; and
dynamically removing the first item information from the monitoring user interface without an intervention from the user of the first computing device on the monitoring user interface.

9. The computer-implemented method of claim 7, further comprising:
generating an items watch-list table that is separate from the user table, the items table and the transaction table in the network-based publication application.

10. The computer-implemented method of claim 1, further comprising:
determining that a value of a first remaining time attribute of the first item information is zero; and
dynamically removing the first item information from the monitoring user interface without an intervention from the user of the first computing device on the monitoring user interface.

11. A server comprising:
a processor configured to execute instructions stored in a computer-readable medium, the instructions providing operations for:
providing, to a first computing device, a first user interface comprising first item information related to a listing of a first item in a network-based publication application;
receiving, via the first user interface, a selection of the first item;
providing, to the first computing device, a second user interface comprising second item information related to a listing of a second item in the network-based publication application;
receiving, via the second user interface, a selection of the second item;
in response to receiving the selection of the first and second items, providing, to the first computing device, a monitoring user interface that consolidates the first and second item information, the monitoring user interface comprising a first interactive rating graphical user area corresponding to the first item, and a second interactive rating graphical user area corresponding to the second item; and dynamically updating a display order of the first and second items in the monitoring user interface based on a first value associated with the first interactive rating graphical user area and a second value associated with the second interactive rating graphical user area without the first computing device accessing the first user interface and the second user interface subsequent to receiving the selection of the first and second items.

12. The server of claim 11, wherein the first item information identifies a first user account, a first price item attribute, and a first remaining time attribute,
wherein the second item information identifies a second user account, a second price item attribute, and a second remaining time attribute.

13. The server of claim 12, wherein the first interactive rating graphical user area comprises a first adjustable element indicating a first item rating information that corresponds to a relative preference of a user of the first computing device for the first item,
wherein the second interactive rating graphical user area comprises a second adjustable element indicating a second item rating information that corresponds to a relative preference of the user of the first computing device for the second item.

14. The server of claim 11, wherein the operations further comprise:
dynamically updating the monitoring user interface based on updated first and second item information without the first computing device accessing the first user interface and the second user interface subsequent to receiving the selection of the first and second items.

15. The server of claim 11, wherein the monitoring user interface further indicates:
first user rating information of a first user account of a first user account associated with the first item; and
second user rating information of a second user account of a second user account associated with the second item.

16. The server of claim 15, wherein updating the display order of the first and second items further comprises:
adjusting a display order of the first and second items in the monitoring user interface based on the first user rating information and the second user rating information.

17. The server of claim 15, wherein the operations further comprise:
accessing a user table, an items table, and a transaction table that operate to implement transactions for items, the user table including records for users of the network-based publication application, the items table including records for items that are transacted in the network-based publication application, and the transaction table including records for transactions of items between the users in the network-based publication application; and
updating the first and second item information based on the user table, the items table, and the transaction table; and
adjusting the monitoring user interface based on the updating.

18. The server of claim 17, wherein the operations further comprise:
determining that the first item listed by the first user account is no longer available in the network-based publication application; and
dynamically removing the first item information from the monitoring user interface without an intervention from the user of the first computing device on the monitoring user interface.

19. The server of claim 17, wherein the operations further comprise:
generating an items watch-list table that is separate from the user table, the items table and the transaction table in the network-based publication application.

20. A non-transitory machine-readable storage medium comprising instructions executable by at least one processor to perform operations comprising:
providing, to a first computing device, a first user interface comprising first item information related to a listing of a first item in a network-based publication application;
receiving, via the first user interface, a selection of the first item;
providing, to the first computing device, a second user interface comprising second item information related to a listing of a second item in the network-based publication application;
receiving, via the second user interface, a selection of the second item;
in response to receiving the selection of the first and second items, providing, to the first computing device, a monitoring user interface that consolidates the first and second item information, the monitoring user interface comprising a first interactive rating graphical user area corresponding to the first item, and a second interactive rating graphical user area corresponding to the second item; and
dynamically updating a display order of the first and second items in the monitoring user interface based on a first value associated with the first interactive rating graphical user area and a second value associated with the second interactive rating graphical user area without the first computing device accessing the first user interface and the second user interface subsequent to receiving the selection of the first and second items.

* * * * *